United States Patent [19]

Edler

[11] Patent Number: 5,160,719

[45] Date of Patent: Nov. 3, 1992

[54] PROCESS FOR NITRIDING SILICON CONTAINING MATERIALS

[75] Inventor: James P. Edler, Troy, Mich.

[73] Assignee: Eaton Corporation, Cleveland, Ohio

[21] Appl. No.: 785,909

[22] Filed: Nov. 4, 1991

Related U.S. Application Data

[63] Continuation of Ser. No. 557,194, Jul. 24, 1990, abandoned.

[51] Int. Cl.$^5$ .................. C01B 33/00; C04B 35/58
[52] U.S. Cl. .................................... 423/344; 264/65; 423/406
[58] Field of Search .................. 423/344, 406; 501/97; 264/65

[56] References Cited

U.S. PATENT DOCUMENTS

| | | | |
|---|---|---|---|
| 2,268,589 | 1/1942 | Henny | 423/344 |
| 2,869,215 | 1/1959 | Smith | 25/156 |
| 3,205,080 | 9/1965 | Ryshkewitch | 106/44 |
| 3,222,438 | 12/1965 | Parr et al. | 264/66 |
| 3,669,723 | 6/1972 | Parr et al. | 117/105.2 |
| 3,819,786 | 6/1974 | Wells May | 264/63 |
| 3,887,412 | 6/1975 | Styhr et al. | 156/89 |
| 3,937,792 | 2/1976 | Lumby | 423/344 |
| 3,950,464 | 4/1976 | Masaki | 264/65 |
| 3,991,166 | 11/1976 | Jack et al. | 423/327 |
| 3,992,497 | 11/1976 | Terwilliger et al. | 264/56 |
| 4,033,400 | 7/1977 | Gurwell et al. | 164/98 |
| 4,036,653 | 7/1977 | Jacobson | 106/47 R |
| 4,067,943 | 1/1978 | Ezis et al. | 264/86 |
| 4,119,689 | 10/1978 | Prochazka et al. | 264/65 |
| 4,164,528 | 8/1979 | Yajima et al. | 264/62 |
| 4,235,857 | 11/1980 | Mangels | 423/344 |
| 4,285,895 | 8/1981 | Mangels et al. | 264/65 |
| 4,354,990 | 10/1982 | Martinengo et al. | 264/65 |
| 4,356,136 | 10/1982 | Mangels | 264/65 |
| 4,376,742 | 3/1983 | Mah | 264/85 |
| 4,377,542 | 3/1983 | Mangels et al. | 264/65 |
| 4,410,636 | 10/1983 | Minjolle et al. | 501/98 |
| 4,443,394 | 4/1984 | Ezis | 264/65 |
| 4,471,060 | 9/1984 | Dickie et al. | 501/151 |
| 4,519,967 | 5/1985 | Crosbie et al. | 264/86 |
| 4,781,874 | 11/1988 | Edler | 264/65 |
| 4,943,401 | 7/1990 | Edler et al. | 264/63 |

FOREIGN PATENT DOCUMENTS

| | | | |
|---|---|---|---|
| 076549 | 6/1977 | Japan . | |
| 081250 | 5/1983 | Japan . | |
| 60-42209 | 6/1983 | Japan | 423/344 |
| 779474 | 7/1955 | United Kingdom . | |

OTHER PUBLICATIONS

Sacks et al., Properties of Silicon Suspensions and Slip-Cast Bodies, 1985, 1109–1123.

Jahn, Processing of Reaction Bonded Silicon Nitride, 1989, 1–24.

Williams et al., Slip Casting of Silicon Shapes and Their Nitriding, 1983, pp. 607–619.

Mangels, "Effect of Rate-Controlled Nitriding and Nitriding Atmospheres on the Formation of Reaction-Bonded $Si_3N_4$"(60), No. 6 (1981), pp. 613–617.

Moulson et al., Nitridation of High-Purity Silicon, 1975, pp. 285–289.

Shaw et al., Thermodynamics of Silicon Nitridation: Effect of Hydrogen, 1982, pp. 180–181.

Moulson, "Reaction-bonded Silicon Nitride: its Formation and Properties", J. Mat. Sci., 14 (1979), 1017–1051.

Atkinson et al., "Nitridation of High-Purity Silicon," J. American Ceramic Society, vol. 59, Nos. 7-8, pp. 285–289.

Primary Examiner—Olik Chaudhuri
Assistant Examiner—Ken Horton
Attorney, Agent, or Firm—P. S. Rulon; L. E. Cargill

[57] ABSTRACT

A process for nitriding materials containing silicon to form a silicon nitride material predominantly in the alpha phase is disclosed which includes nitriding the silicon-containing material by subjecting it to a nitriding atmosphere containing at least nitrogen gas in combination with at least one other nitriding gas while keeping the composition of the nitriding atmosphere substantially constant by maintaining a substantially constant partial pressure of nitrogen gas during the nitriding, even though nitrogen is being consumed during the nitriding step to form the silicon nitride.

13 Claims, No Drawings

PROCESS FOR NITRIDING SILICON CONTAINING MATERIALS

This is a continuation of copending application Ser. No. 557,194 filed on Jul. 24, 1990 now abandoned.

TECHNICAL FIELD

This invention relates generally to a process for making silicon nitride articles or particles, and specifically relates to the nitriding process for producing such articles and powders. This application also relates to copending applications entitled Process For Making Silicon Nitride Articles; Process For Preparing A Nitridable Silicon-Containing Material Having At Least On Densification Aid Including Alumina, And The Material Resulting Therefrom; New Ceramic Phase In Sintered Silicon Nitride Containing Cerium, Aluminu, And Iron; Process For Preparing An Alpha-Phase Silicon Nitride Material And Thereafter Converting To Non-Densified Beta-Phase Material And The Material Resulting Therefrom; Process For Preparing A Densified Beta-Phase Silicon Nitride Material Having At Least One Densification Aid, And The Material Resulting Therefrom; and Process For Preparing A Base Nitridable Silicon-Containing Material And The Material Resulting Therefrom.

BACKGROUND OF THE INVENTION

Silicon nitride has been a material of interest for many years due to its high temperature strength, creep resistance and low thermal expansion, as well as its extremely efficient resistance to corrosion and its ability to make critically engineered parts.

Generally, the practice of nitriding silicon-containing material has been investigated for many years, and has resulted in a process which takes a very long time, so long in fact that the process is not commercially feasible. It would be advantageous to practice a method for nitriding the silicon-containing material to produce silicon nitride in a manner which takes less time than current methods, as well as producing a material which has substantially the same properties.

Generally, it has been the practice to form silicon nitride parts by "reaction bonding" or by "hot pressing" or by a pressureless sintering process. Reaction bonding comprises compacting silicon powder of commonly less than 400 mesh into the part commonly at ambient temperature and then exposing the part to molecular nitrogen at about 1400° C. for a period of time sufficient to convert the silicon to silicon nitride such as disclosed in U.S. Pat. No. 4,235,857, the disclosure of which is incorporated herein by reference. Such is also reviewed by A. J. Moulson in an article titled "Review Reaction-Bonded Silicon Nitride: Its Formation and Properties," Journal-Materials Science, 14, (1979) 1017–1051 and by Mangels in an article titled "Effect of Rate-Controlled Nitriding and Nitriding Atmospheres on the Formation of Reaction-Bonded $Si_3N_4$", Ceramic Bulletin, Volume 60, No. 6 (1981), 613 in which he also describes benefits derived by using a nitriding gas mixture of nitrogen with minor amounts of hydrogen and helium. The use of a combined nitrogen-hydrogen nitriding gas in the reaction bonding of $Si_3N_4$ is described by Shaw and Zeleznik in an article titled "Thermodynamics of Silicon Nitridation: Effect of Hydrogen", communications of the American Ceramic Society, November 1982, C180–C181 and the effect of temperature and nitrogen pressure on the kinetics of silicon nitridation along with the need for an activating agent such as iron is described by Atkinson, Moulson and Roberts in an article titled "Nitridation of High-Purity Silicon", Journal American Ceramic Society, Volume 59, No. 7–8, 285–289.

Up until the time of the present invention, it has been the practice to nitride silicon powder by heating for long periods of time. An example of such is disclosed in U.S. Pat. No. 3,819,786, where a blend of silicon nitride powder and a binder mixture is heated in a stream of nitrogen from ambient to 1000° C. at 50° C./hr and then held under static nitrogen for 20 hours at 1350° C. and 10 hours at 1450° C. with a total nitriding time of more than thirty hours.

An example of a compound heating schedule for nitriding a mixture of silicon and silicon carbide powder is disclosed in U.S. Pat. No. 3,222,438, the disclosure of which is incorporated herein by reference, where the mixture is first compacted into a green compact and then heated in an atmosphere of nitrogen at a temperature of 1250° C. for 16 hours and then at 1450° C. for 3–4 hours where the first stage heating is conducted to presinter the compound so that it doesn't melt at the 1450° C. temperature since the melting point of silicon is about 1420° C.

Reaction bonded silicon nitride is commonly prepared by reacting and nitriding the silicon (either as a powder or as a formed article) with nitrogen by exposing the silicon to a nitrogen-containing atmosphere at temperatures of 1100° C. to about 1420° C. for times sufficient to produce the silicon nitride. It is not uncommon for the nitriding time in prior art methods to about 100–200 hours. It is normal for a small amount of nitriding aid (e.g., iron oxide or nickel oxide) to be initially mixed with the silicon powder to enhance the nitridation of the silicon during the nitriding step.

U.S. Pat. No. 3,206,318 to Yamauchi et al. teaches a method of nitriding metallic silicon which lowers the ill effects of the oxidation of silicon nitride, in which the nitriding catalyst is (a) at least one primary substance selected from the group consisting of metallic vanadium, the inorganic compounds thereof, and mixtures thereof; or (b) that comprising (a) in which has been incorporated at least one secondary substance, selected from the group consisting of metallic cobalt, manganese, chromium, copper, nickel, iron, barium, and calcium and the inorganic compounds thereof. Yamauchi, et al. also teach a refractory article in which granular refractory material, such as alumina, is bonded with silicon nitride. The patent furthermore teaches that the oxides of the metals, Cu, Co, Ni, Cr, Mn and V, may likewise be used and that the quantity of these oxides is suitably 0.1–2 moles in terms of the metallic element to 100 moles of the silicon.

U.S. Pat. No. 4,235,857, METHOD OF NITRIDING SILICON, to Mangels teaches that silicon can be nitrided using a nitriding cycle over the temperature range of 900° C. to 1420° C. in an atmosphere consisting of a mixture of nitrogen, hydrogen and helium. However, the chemical composition of the nitriding gas is constantly changing due to the consumption of nitrogen during the nitridation of the silicon article, with the chemical activity of the nitrogen decreasing (partial pressure of nitrogen in the furnace decreases) as the temperature increases. The examples cited by Mangels have nitriding times of from 130 to 175 hours.

U.S. Pat. No. 4,351,787 to Martinengo et al. teaches that sintered silicon nitride articles can prepared by forming a silicon powder mixture containing one or more sintering additives into a compact, the additives being present in the powder in an amount such as to ensure an additive content of from 0.5 to 20 wt % in the silicon nitride compact; heating the compact under a pure nitrogen gas blanket at a temperature not exceeding 1500° C. to convert the silicon into reaction bonded silicon nitride; and sintering the reaction bonded silicon nitride compact by heating in a nitrogen gas atmosphere at a temperature of at least 1500° C. Furthermore, it is taught that the silicon powder size is from 0.1 to 44 microns in size and of high purity or containing only very small amounts of nitriding catalysts. The Martinengo et al. patent teaches that any conventional sintering additive may be used. Best results are said to be achieved by using MgO, and especially in combination with $Y_2O_3$. Other preferred additives mentioned in the patent are MgO, $Y_2O_3$, $CeO_2$, $ZrO_2$, BeO, $Mg_3N_2$, and AlN. Other examples of additives are given as $Mg_2Si$, $MgAl_2O_4$, and rare earth additions such as $La_2O_3$. Also iron can be used with advantage, usually in mixture with conventional additives such as MgO, $Y_2O_3$, and $CeO_2$.

It is, therefore, a primary object of the present invention to provide an improved process for nitriding silicon-containing materials to minimize the processing time, while retaining a high quality end product.

SUMMARY OF THE INVENTION

In accordance with the preferred embodiment of the invention, these and other objects and advantages are addressed as follows. Methods are disclosed for nitriding a silicon-containing material to form silicon nitride which is processable in substantially less time than typical prior art methods.

A process for making silicon nitride material is disclosed comprising the step of nitriding silicon-containing material by exposure to a nitriding atmosphere in a furnace at an elevated temperature, wherein the nitriding atmosphere contains at least nitrogen gas in combination with at least one other nitriding gas while maintaining a substantially constant nitrogen gas partial pressure throughout the nitriding step. The preferred nitriding atmosphere comprises from about 40 to about 60 mole percent helium, from about 40 to about 60 mole percent nitrogen, from about 1 to about 4 mole percent hydrogen, and from about 0 to about 5 mole percent water vapor. Furthermore, it is desirable to perform the nitriding step while heating the silicon powder at a substantially linearly increasing temperature rate of from about 5° C. to about 50° C. per hour, more favorably from about 15° to about 25° C. per hour, until a temperature of about 1350° C. to about 1450° C. is reached. Consequently, the nitriding step may take from about 7 to 90 hours depending on the temperature achieved and the temperature increasing rate. For example, if the temperature was raised from 1000° C. to 1350° C. at an upward rate of 50° C./hr., then the nitriding step would take about 7 hours. If, on the other hand, the temperature was raised from 1000° C. to 1450° C. at an upward rate of 5° C./hr., then the nitriding step would be about 90 hours. Superior results have been achieved when the composition of the nitriding gas remains substantially constant throughout the nitriding step by monitored addition of substantially pure nitrogen to the helium, hydrogen and nitrogen combination as the nitrogen is used up in the formation of silicon nitride from the elemental silicon. In addition, up to about five percent of the nitriding atmosphere may be water vapor.

A particular advantage of the present invention over the prior art is the ability of the resultant material to be nitrided in a furnace heated at a substantially linear rate thereby saving a great amount of time. The present invention may be linearly heated, without periods of temperature holding or maintenance, due to the particular processing and combination of elements. This advantage is of great importance because it reduces the manufacturing time to a fraction of the prior art methods. Whereas prior art methods describe reaction furnace times of from about 120 hours (5 days) to 29 days, the present invention may generally be practiced within several hours. Therefore, the present invention brings the manufacture of quality silicon nitride powder and compacted articles well within the realm of commercial feasibility.

Nitriding of the silicon body is typically accomplished by increasing the temperature of the furnace from about 1000° C. to approximately 1450° C. at the rate of about 5° C. to about 50° C. per hour. Finally, the silicon nitride mass, whether powder or article, is cooled to room temperature. It may be advantageous to process the mass on a vibratory finisher to remove any light-colored surface coating. Processed powders and compacted articles may be manufactured utilizing the same above described processes.

This invention has the advantage of allowing relatively rapid, linear heating during nitridation (5°-50° C. per hour) without resulting in too rapid a reaction which tends to cause consequent melting of the silicon, and has been experienced in the prior art. In prior art methods, linear heating was not utilized because it caused overheating of the silicon containing mass, resulting from the inability to control the highly exothermic reaction of the silicon with nitrogen during nitriding. Temperature plateaus were required to alleviate overheating in the prior art methods. These plateaus cause great time delay and result in considerably longer manufacturing times. Linear heating has a distinct advantage in that the reaction occurs much more quickly, thereby increasing the commercial feasibility of manufacturing silicon nitride.

It is believed that the present invention helps to prevent such an overheating reaction from occurring due to the use of helium and the presence of gaseous water in the nitriding gas. Helium has a relatively high thermal conductivity which is believed to greatly assist in removing the heat from the reaction sites, so that the occurrence of localized hot spots is reduced during the reaction. Water vapor may be deliberately introduced into the nitriding atmosphere or may be carried with the silicon as an oxyhydrate coating as described in copending application entitled Process For Making Silicon Nitride Articles. The water vapor also appears to help moderate the highly exothermic reaction of silicon with nitrogen as it forms silicon nitride.

DETAILED DESCRIPTION OF THE INVENTION

The processes of this invention generally include nitriding a silicon-containing material to form a silicon nitride material predominantly in the alpha phase. The silicon-containing material is nitrided by subjecting to a nitriding atmosphere at an elevated temperature to effect the nitriding. The nitriding atmosphere contains at least nitrogen gas in combination with at least one other nitriding gas. The composition of the nitriding atmosphere is kept substantially constant even though nitrogen is being consumed during the nitriding step by maintaining a substantially constant partial pressure of nitrogen gas during the nitriding. The nitriding atmosphere containing at least nitrogen gas may include: (1) substantially pure nitrogen gas; (2) nitrogen and helium gases; (3) nitrogen, helium and hydrogen gases; and (4) nitrogen, helium, hydrogen, and water vapor gases. The nitrogen may be present from about 10 to about 90 mole percent, while helium may be present from about 10 to 90 mole percent, hydrogen present from about 1 to about 10 mole percent, and the water vapor from about 0 to about 5 mole percent. The nitrogen atmosphere may be a combination of these mole percentages of the above-described gas constituents.

The nitriding step is to be performed while heating at an increasing temperature rate of from about 5° C.–50° C. per hour until an elevated temperature of about 1350° C. to about 1450° C. is reached. The nitriding step preferably begins at about 1000° C. with an increasing temperature rate of about 5° C. to about 50° C., and preferably increases at the rate of 15°–25° C. per hour. The increasing temperature rate during nitriding is preferably substantially linear. The nitriding step is held between about 1350° C. to about 1450° C. for less than 2 hours after the temperature has been increased. Furthermore, the nitriding is preferably accomplished with a system pressure of from about a ½ atmosphere absolute up to about 2 atmospheres absolute.

During this heating and nitriding cycle, nitrogen is consumed by the silicon to form silicon nitride. The nitriding gas composition in the furnace atmosphere is kept constant by admitting substantially pure nitrogen gas into the furnace to maintain the slightly greater than atmospheric pressure. Once the upper temperature is reached, from about 1350° C. to about 1450° C., preferably 1420° C., that temperature is maintained for about 1 hour and the heat source is shut off and the silicon nitride powder or articles are allowed to cool. Samples prepared by this method display excellent properties, low size distortion and high material integrity In one embodiment of the present invention, a process for nitriding materials containing silicon which has been comminuted with water is disclosed, the comminuting being performed to enhance and allow substantial chemical reaction between the silicon and the water. It is believed that a silicon nitride material is formed which is predominantly in the alpha-phase. The method includes nitriding the water comminuted silicon-containing material by subjecting to a nitriding atmosphere containing at least nitrogen gas containing about 40 to about 60 mole percent nitrogen, from about 40 to about 60 mole percent helium, and from about 1 to about 4 mole percent hydrogen. Preferably, the nitriding begins at about 1000° C. and occurs with a substantially linear upwardly increasing temperature rate of from about 5° C. to about 50° C. per hour to an elevated temperature of between about 1350° C. to about 1450° C. at a system pressure of from about one half to about two atmospheres absolute. The composition of the gas constituents of the nitriding atmosphere is maintained with a substantially constant partial pressure of nitrogen gas during the nitriding. Another process for nitriding materials containing silicon further may include the addition of up to about five percent water vapor in the nitriding atmosphere. This mode is useful with silicon-containing materials which have been drymilled or otherwise processed such that they do not contain the water-silicon product.

Thus, there is provided in accordance with the present invention, a method for nitriding a silicon-containing material which takes much less time than the prior art methods.

The following example is illustrative only of a typical procedure and its resulting properties, and should not be construed as limiting the invention which is properly delineated in the appended claims:

Added together in a ball mill are: (1) 100 pounds commercial grade silicon metal powder ground to approximately 2.3 F.A.D. (Fisher Average Diameter) or finer, which is substantially less than 20 micron size; (2) 3 pounds micron size iron oxide $Fe_2O_3$; (3) 68 pounds distilled water; and (4) 50 grams of dispersing aid, Darvan No. 1, a registered trademark of the R. T. Vanderbilt Company, Inc. This slurry mixture is comminuted for 3 hours while venting the evolving gases (hydrogen and water vapor) every hour. Then 1½ pounds polyvinylalcohol (available from Air Products, Inc., Allentown, Pa.), ½ pound polyethylene glycol (CARBOWAX 1000 available from Union Carbide Corporation, New York, N.Y.), ¼ pound xanthan gum (KELZAN, available from Kelco, a division of Merck & Co., Inc., Rahway, N.J.), and 1 pound food grade glycerol are added to the slurry in the ball mill and comminution is continued for about 1 hour. These organic additives have an added advantage in that they are all food grade materials, thus posing greatly reduced toxicity problems over prior art methods.

After ball milling, the slurry is pumped into a holding tank, covered loosely to allow evolving gases to escape, and aged overnight to allow the majority of the reaction between the silicon and the water to occur. The reaction is evidenced by substantial frothing which is reduced by morning.

The reacted slurry is transferred into a circulating tank and continuously circulated to keep the viscosity low by shearing, thereby keeping the slurry from gelling due to the presence of the xanthan gum.

The slurry is then pumped into a spray dryer, and spray-dried. The collected spray-dried granules are screen-separated into three distinct particle size ranges. The particles that are greater than 30 mesh in size are set aside for recycling. The fine particles of less than 200 mesh are isopressed in an isopress machine to produce billets. The spray-dried granules of a size between 30 and 200 mesh are put into a dry press and pressed into green body parts. Due to the addition of the organic materials, the green body parts are easily machinable after isopressing or dry pressing without having to pre-sinter or pre-nitride to add strength to the silicon body. The pressed parts are then racked on saggers and put into a furnace.

The furnace is evacuated to −100 KPa and then filled with pure hydrogen gas. The temperature of the furnace is then increased from room temperature to 1000° C. over a two hour period by a near progression of increasing temperature while flowing hydrogen through the furnace at atmospheric pressure to burn off the organic materials. The substantially non-toxic effluent which is vented includes carbon dioxide and water.

The furnace is purged with flowing nitrogen to obtain a noncombustible atmosphere and then evacuated again to remove the nitrogen and any remaining effluent. Helium gas is added until a pressure of 50 KPa absolute is indicated. Then a nitrogen-hydrogen gas blend consisting of 4 weight percent hydrogen and 96 weight percent nitrogen is admitted to the furnace until the pressure is slightly above atmospheric pressure (approximately 120 KPa absolute) to avoid any leakage of ambient air into the furnace. The resulting composition of the nitriding gas constituents nitrogen, helium and hydrogen in the nitriding gas are 48%, 50% and 2%, respectively. No water vapor is required in the nitriding gas in this procedure because the silicon was initially comminuted with water and substantial reaction was allowed to occur.

The temperature is then preferably increased from 1000° C. to about 1420° C. at a linear rate of about 20° C. per hour. During this heating cycle, nitrogen is consumed by the silicon to form silicon nitride. The nitriding gas composition in the furnace atmosphere is kept constant by admitting pure nitrogen gas into the furnace as nitrogen is consumed during the conversion of the silicon to maintain a constant nitrogen partial pressure. Once 1420° C. is reached, the temperature is maintained for 1 hour; then the heat source is shut off and the silicon nitride articles are allowed to cool. Samples prepared by this method display excellent properties, low size distortion and high material integrity.

Test bars of the reaction bonded silicon nitride may be made having dimensions of 0.100×0.320×2.25 inches. In four-point modulus of rupture tests of such bars using conditions consisting of a lower span of 1.75 inches and an upper span of 0.60 inches with a loading rate of 0.02 inches/minute, typical values for the density, the average four-point modulus of rupture (MOR), and the range of MOR strengths are provided in Table 1.

TABLE 1

| Density (gm/cc) | 4-Point MOR Averages (Kpsi*) | 4-Point MOR Range (Kpsi) |
| --- | --- | --- |
| 2.8–2.9 | 31–36 | 27–42 |

*Kpsi = Thousands of pounds per square inch.

While our invention has been described in terms of a typical example, it will be appreciated that other forms could readily be adapted by one skilled in the art. Accordingly, the scope of our invention is to be considered limited only by the following claims.

What is claimed is:

1. A process for nitriding materials containing silicon to form a silicon nitride material predominantly in the alpha-phase, comprising nitriding the silicon-containing material by subjecting to a nitriding atmosphere at an elevated temperature to effect nitriding at a linearly increasing temperature rate during nitriding for a time period of between about 7 and about 90 hours, said nitriding atmosphere containing at least nitrogen, helium and hydrogen gas, and the composition of said nitriding atmosphere being kept constant by maintaining the partial pressures within the nitriding atmosphere by the monitored addition of only the nitrogen gas component, even though the nitrogen component is being consumed during the nitriding.

2. The process of claim 1, wherein said nitriding atmosphere includes from about 10 to about 90 mole percent nitrogen.

3. The process of claim 1, wherein said nitriding atmosphere includes from about 10 to about 90 mole percent helium.

4. The process of claim 1, wherein said nitriding atmosphere includes from about 1 to about 10 mole percent hydrogen.

5. The process of claim 1, wherein said nitriding atmosphere includes about 10 to about 90 mole percent nitrogen, about 10 to about 90 mole percent helium, and about 1 to about 10 mole percent hydrogen.

6. The process of claim 1, wherein said nitriding atmosphere comprises from about 40 to about 60 mole percent nitrogen, from about 40 to about 60 mole percent helium, and from about 1 to about 10 mole percent hydrogen.

7. The process of claim 1, wherein said nitriding step is performed while heating at a linearly increasing temperature rate of from about 5° C. to about 50° C. per hour until an elevated temperature of about 1350° C. to about 1450° C. is reached.

8. The process of claim 1, wherein said nitriding step begins at about 1000° C. with a linearly increasing temperature rate of about 5° C. to about 50° C. per hour until an elevated temperature of about 1350° C. to about 1450° C. is reached.

9. The process of claim 1, wherein the increasing temperature rate during nitriding is a 15°-25° C. increase per hours.

10. The process of claim 1, further comprising holding the nitriding step between about 1350° C. to about 1450° C. for less than 2 hours.

11. The process of claim 1, wherein said nitriding is accomplished with a system pressure of from about a one-half atmosphere absolute up to about two atmospheres absolute.

12. A process for nitriding materials containing silicon to from a silicon nitride material in the alpha-phase, comprising nitriding the silicon-containing material by subjecting to a nitriding atmosphere which contains from about 10 to about 90 mole percent nitrogen, from about 10 to about 90 mole percent helium, from about 1 to about 10 mole percent hydrogen, and up to abut 5 mole percent water vapor, said nitriding occurring with a linearly upwardly increasing temperature rate of from about 5° C. to about 50° C. per hour to an elevated temperature of between about 1350° C. to about 1450° C. at a system pressure of from about one half to abut two atmospheres absolute, wherein the composition of the gas constituents of said nitriding atmosphere and maintained with a constant partial pressure of nitrogen gas during the nitriding.

13. A process for nitriding materials containing silicon to form a silicon nitride material predominantly in the alpha-phase, comprising nitriding the silicon-containing material bu subjecting to a nitriding atmosphere beginning at 1000° C. and increasing the temperature rate linearly during the nitriding at a rate of from about 15° to 25° C. per hour, until an elevated temperature of between about 1350° and 1450° C. is achieved and maintained for less than about 2 hours, said nitriding atmosphere composition containing from about 40 to about 60 mole percent nitrogen, from about 40 to about 60 mole percent helium, and from about 1 to about 10 mole percent hydrogen, wherein the individual partial pressures of each gas component of the nitriding atmosphere remain constant throughout the nitriding step, with the total system pressure being between about ½ and 2 atmospheres absolute.

* * * * *